No. 677,323. Patented June 25, 1901.
R. P. PICTET.
APPARATUS FOR SEPARATING OXYGEN AND NITROGEN FROM MIXTURES THEREOF.
(Application filed Jan. 17, 1900.)
(No Model.)
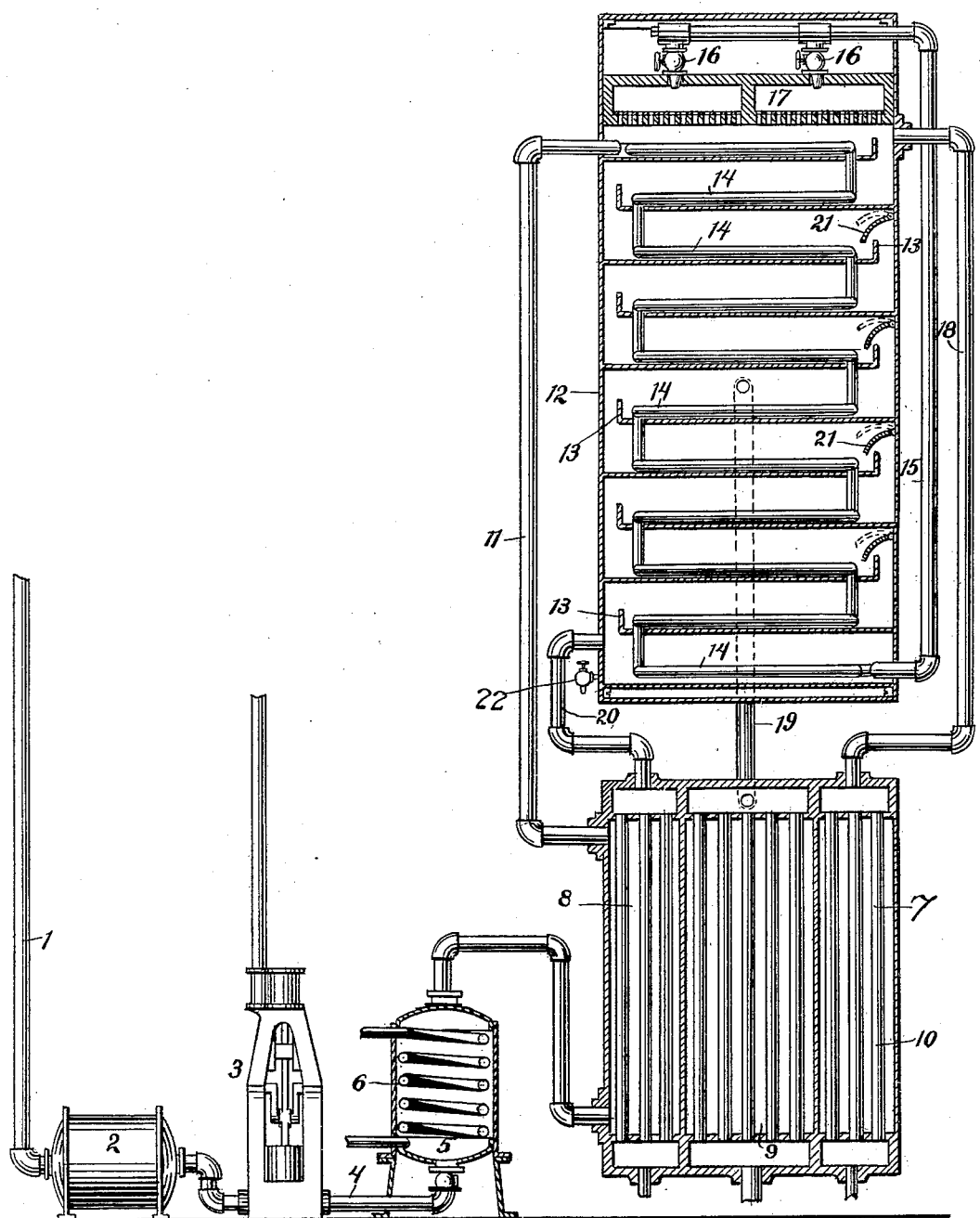

UNITED STATES PATENT OFFICE.

RAOUL PIERRE PICTET, OF NEW YORK, N. Y.

APPARATUS FOR SEPARATING OXYGEN AND NITROGEN FROM MIXTURES THEREOF.

SPECIFICATION forming part of Letters Patent No. 677,323, dated June 25, 1901.

Original application filed August 5, 1899, Serial No. 726,334. Divided and this application filed January 17, 1900. Serial No. 1,732. (No model.)

*To all whom it may concern:*

Be it known that I, RAOUL PIERRE PICTET, a citizen of the Swiss Confederation, residing at New York, in the county of New York and State of New York, have invented certain new and useful Improvements in Apparatus for Separating Oxygen and Nitrogen from Mixtures Thereof; and I do hereby declare the following to be a full, clear, and exact description of the invention, such as will enable others skilled in the art to which it appertains to make and use the same.

My invention relates to an apparatus for separating from their mixtures two or more gases, such as oxygen and nitrogen, which are capable of being liquefied and are of different volatility.

My invention consists in the novel construction of the evaporator and in the combination therewith of an exchanger, compressor, cooler, and filter.

The apparatus herein described is intended for carrying out the process described and claimed in my application for Letters Patent for a process of separating oxygen and nitrogen from mixtures thereof, filed August 5, 1899, Serial No. 726,334, and this application is a division of the said application.

The object of my invention is to provide a simple, inexpensive, and efficient apparatus for separating liquefied gases of different volatility and to make the apparatus as nearly automatic as possible. This object is attained in the apparatus herein described, and illustrated diagrammatically in the drawing which accompanies and forms a part of this specification, which drawing illustrates, besides the evaporator, a compression-pump, a dehydrator, an exchanger, and a carbonic-acid filter, all shown in section.

The process of separating oxygen and nitrogen or other similar gases from their mixtures carried out in this apparatus is based upon the fact that when a mixture of such gases, such as atmospheric air, is liquefied and then allowed to evaporate slowly the nitrogen begins to evaporate before the oxygen, so that if the evaporation takes place under proper but easily-obtainable conditions the two gases may be separated by what is, in fact, a process of fractional distillation, although conducted at temperatures far below those at which distillation is ordinarily conducted. In this process also the heat absorbed by the liquefied gases while evaporating is derived from the entering current of air or other mixture of oxygen and nitrogen to be liquefied, so that comparatively little compression and cooling of the entering current of mixed gases before the outgoing currents of gases are encountered is required.

In the drawing, 1 designates an air-supply pipe, 2 a filter, and 3 a compression-pump. The purpose of the filter 2 is to remove from the entering air dust and other impurities carried by it in such form that they may be removed by filtration. The filter may be constructed in the same manner as the air-filters commonly employed for purifying atmospheric air.

The compressor 3 may be of any usual or convenient type capable of compressing air up to a pressure of about one hundred and fifty atmospheres.

From the compressor the air passes through a pipe 4 to a dehydrator 5. This dehydrator consists, substantially, of a tank adapted to contain brine or a solution of chlorid of calcium or other liquid which may be cooled to a low temperature without freezing. Preferably the solution within the dehydrator should be maintained at a temperature of about 40° centigrade. This may be effected conveniently by employing cooling-coils 6 within the dehydrator, through which brine cooled to the requisite point by a refrigerating-machine may be circulated, or any other suitable refrigerating agent may be circulated through the cooling-coils in place of brine. The air which enters the dehydrator through the pipe 4 bubbles up through the liquid in the dehydrator. Any moisture carried by the air is frozen by the contact with the intensely-cold brine solution and the air which passes from the dehydrator is perfectly dry. From the dehydrator the air passes through the exchanger 7. This exchanger consists, essentially, of a casing containing three separate series of cooling-pipes 8, 9, and 10, respectively. The air from the dehydrator passes around but not through these cooling-pipes and then passes through a pipe 11 into an evaporator 12. This evaporator consists, essentially, of a casing within which are a series of shallow evaporating trays or pans 13, placed one above the other in such manner that liquid overflowing from one tray falls into the tray beneath. As hereinafter explained, the liquid which is introduced into the upper of these trays and flows successively from one tray to the other is liquid air or other liquefied mixture of oxygen and nitrogen. In its evaporation, therefore, it is capable of absorbing and must absorb a great quantity of heat. Such heat is abstracted from the air entering the evaporator through the pipe 11, for this pipe is connected to a pipe-coil 14, lying within the uppermost of the evaporating-pans 13, and the coil 14 of the uppermost pan is connected with another similar coil in the pan next below, so that the entering air passes down through the several coils of pipe within the pans of the evaporator. By the time the air has reached the coil 14 in the lowermost tray 13 it is completely liquefied. It is then forced upward by the pressure behind it through the pipe 15 to a point within the casing of the evaporator, but above the evaporating-trays thereof, and is discharged through cocks 16 into a filter 17 and from thence flows into the uppermost evaporating-tray 13.

The filtering medium employed in the filter 17 may be cloth, cotton, asbestos, or any other material convenient for the purpose. The filter may be constructed as filters employing such filtering mediums are commonly constructed.

The purpose of the filter 17 is to abstract from the liquid air carbonic acid and other impurities which are still gaseous at the temperature of the brine in the dehydrator 5, but are frozen solid when the air is liquefied.

When the liquid air enters the evaporating-tray at the top of the evaporator, it commences to evaporate. Because liquid nitrogen is more volatile than liquid oxygen the nitrogen begins to evaporate first, and the temperature of the coils 14 in the evaporating-trays being low and the temperature of the interior of the evaporator being nearly that of the evaporating-point of the fluid the gas liberated in the upper portion of the evaporator is practically pure nitrogen. In the central portion of the evaporator nitrogen and oxygen come off together, and in the lower portion of the evaporator the gas evolved is practically pure oxygen, the nitrogen having been evaporated before the lower portion of the evaporator is reached. To carry off the gases thus liberated in the evaporator, three pipes are employed, 18, 19, and 20, connected, respectively, to the upper portion of the evaporator, to the middle portion thereof, and to the lower portion thereof. To prevent mingling of the gas in the middle portion of the evaporator, which is a mixture of oxygen and nitrogen, with the pure nitrogen in the upper portion of the evaporator and the pure oxygen in the lower portion of the evaporator, I provide movable gates or valves 21, which extend across the evaporator and may be so placed that they project into the fluid of the trays, thus forming a water seal to prevent the passage of gas without interfering with the flow of the fluid from one tray to the next. These gates 21 are mounted upon revoluble shafts projecting through the sides of the evaporator, and by turning said shafts the gates may be raised or lowered, as desired. In the drawing four such gates are shown; but only two should be in action at any one time, unless, indeed, a greater number of gas-escape pipes be provided and unless it be desired to divide the evaporator into more than three sections.

The pipe 18 connects with the section 10 of the exchanger, the pipe 19 with the section 9, and the pipe 20 with the section 8. The division of the exchanger into these sections is necessary in order to avoid mingling the gases after their separation; but since the entering air passes through all three sections of the exchanger all of the cooling power of the outgoing gases which it is possible to utilize is utilized. The cooling-surface in the several sections of the exchanger should be proportioned according to the relative amounts of gas passing through such sections of the exchanger, so that each section may be equally efficient.

The gas issuing from section 8 of the exchanger is practically pure oxygen and may be conducted to a suitable receiver. The gas issuing from section 10 of the exchanger is practically pure nitrogen and may be conducted to a suitable receiver also, and the gas issuing from the section 9 of the exchanger, being a mixture of the two gases, may be discharged into the air-supply pipe 1, if desired, and passed through the apparatus again.

It will be noted that in this process there is a practically complete exchange of heat between the entering current of air and the outgoing currents of gases. The only work which it is necessary to do in order to keep the apparatus in operation, therefore, is the work required to compensate for the heat absorbed from the surrounding atmosphere and similar slight thermal gains, and such gains are compensated for completely by the work done in the compression of the entering air in the compressor 3 and by the heat abstracted from the air in passing through the dehydrator 5. At the commencement of the operation of the apparatus it may be necessary to compress the entering air to a pressure as high as one hundred and fifty atmospheres; but as the apparatus becomes thoroughly chilled the initial pressure of the air may be reduced very greatly.

The manner of carrying on the process is as follows: The evaporating-trays of the evaporator are first filled with liquid air derived from some external source. Such liquid air may be introduced through a suitable cock, (not shown in the drawing,) as will be readily understood. The brine solution in the dehydrator 5 is then cooled to the requisite temperature and the operation of the compressor 3 is commenced. Air is then drawn in by the compressor, filtered, compressed, and is then passed through the dehydrator, wherein the water carried by it is removed and its temperature is lowered the requisite amount. The air then enters the exchanger, wherein it is cooled still further by contact with the pipes through which the gas liberated in the evaporator is passing, and passing through the pipe 11 into the upper coil 14 in the evaporator is cooled by the liquid air surrounding said coil. The air in its passage through the coils 14 from the upper coil to the lowest coil is liquefied. It then passes through the pipe 15 into the filter 17, wherein the carbonic acid carried by it is removed, and finally it passes into the trays 13 within the exchanger, taking the place of the liquid air within said trays with which the operation was started and which in the meantime has been evaporating. The gas which evaporates in the upper portion of the evaporator is practically pure nitrogen. In the central portion of the evaporator the oxygen begins to evaporate and by the time the liquid has reached the lower trays of the evaporator practically all of the nitrogen has evaporated, the residue being practically pure oxygen.

The purity of the nitrogen and oxygen drawn off from the apparatus may be varied by lowering or raising different gates 21. If only the lower and upper gates are down, the others being raised, the purity of the oxygen and nitrogen will be the maximum obtainable. If the second gate from the top be down, the first being raised, the nitrogen delivered may contain some oxygen, which for some purposes may be preferable, and if the second gate from the bottom be down, the lowermost gate being up, the oxygen delivered may contain some nitrogen. For many industrial purposes it may not be necessary to obtain the oxygen nearly free from nitrogen, and in such case the adjustment of the gates 21 in the lower portion of the evaporator will be regulated accordingly.

Any liquid which may collect in the bottom of the evaporator is practically pure oxygen, and, if desired, may be drawn off through a cock 22, provided for the purpose.

The evaporator, exchanger, and connections should be well lagged to avoid absorption of heat from the surrounding air so far as possible.

The apparatus herein described may be employed in the same manner for the separation of other gases capable of being liquefied together and which differ in volatility.

Having thus completely described my invention, what I claim, and desire to secure by Letters Patent, is—

1. An apparatus for separating mixed gases, which are capable of being liquefied, and differ in volatility, comprising apparatus for liquefying such gases, containing an evaporator consisting of a closed chamber provided with a series of liquid-receptacles arranged to receive the liquefied gases, and to cause the same to flow from one receptacle to the other, successively, and also provided with means for separating the gas evolved in the upper portion of the evaporator from that evolved in lower portions thereof.

2. In an apparatus for separating mixed gases capable of being liquefied, and differing in volatility, the combination of a compressor, means for cooling the gas delivered therefrom, and an evaporator provided with means for bringing the entering currents of mixed gases and the evaporating liquefied gases into proximity, and also provided with means for separating the gas evolved in the upper portion of the evaporator from that evolved in lower portions thereof, all connected together and forming a closed system with no outlet for the escape of the compressed gases, during the normal operation of the apparatus, at points intermediate between the compressor and the outlets of the evaporator.

3. In an apparatus for separating mixed gases, capable of being liquefied, and differing in volatility, the combination, with means for compressing and cooling the mixed gases, of an evaporator consisting of a casing containing a series of liquid-receptacles, arranged to cause fluid to flow from one to the other, said receptacles containing conduits connected in series, and through which gas or liquid may be passed in proximity to the fluid within said receptacles, the compressing and cooling apparatus being connected with one of said conduits in the upper portion of the evaporator, the compressed gas being therefore caused to enter the evaporator near the top and to pass downward into the lower portion thereof, a passage connected to the conduits in the lower portion of the evaporator, and arranged to transfer the fluid liquefied in such conduits to the receptacles in the upper portion of the evaporator, and means for separating the gas evolved in the upper portion of the evaporator from that evolved in lower portions thereof.

4. In an evaporator for the purpose described, the combination, with a casing containing a series of liquid-receptacles arranged to cause fluid to flow from one to the other, of movable gates for separating the gas evolved in one portion of the evaporator from that evolved in another portion thereof.

5. In an evaporator for the purpose described, the combination, with a casing containing a series of liquid-receptacles arranged zigzag one above the other, and each closing the casing except at one end, said receptacles being arranged to cause fluid to flow from one to the other, of gates extending across the casing and adapted to project down into the liquid within said receptacles, thereby dividing the casing into sections.

In testimony whereof I affix my signature in the presence of two witnesses.

RAOUL PIERRE PICTET.

Witnesses:
H. M. MARBLE,
E. H. TUCKER.